Dec. 20, 1966 G. N. FRANKS 3,292,275
APPARATUS FOR RESTORING MOISTURE TO COTTON
Filed April 8, 1964 3 Sheets-Sheet 1

INVENTOR
GERALD N. FRANKS

BY
*R. Hoffman*
ATTORNEY

United States Patent Office 3,292,275
Patented Dec. 20, 1966

3,292,275
APPARATUS FOR RESTORING MOISTURE TO COTTON
Gerald N. Franks, Greenville, Miss., assignor to the United States of America as represented by the Secretary of Agriculture
Filed Apr. 8, 1964, Ser. No. 358,384
2 Claims. (Cl. 34—171)

A non-exclusive, irrevocable, royalty-free license in the invention herein described, throughout the world for all purposes of the United States Government, with the power to grant sublicenses for such purposes, is hereby granted to the Government of the United States of America.

This invention relates to an apparatus for restoring moisture to seedcotton. More particularly, it relates to an apparatus for bringing the moisture content of seedcotton up to an optimum value, prior to ginning, when the seedcotton is to dry.

Control of fiber moisture content of cotton during the cleaning and ginning process is one of the most important functions of the ginning plant. Cotton containing a low moisture content releases foreign matter more readily than cotton with high moisture content, and for optimum fiber quality and ginning, recommendations call for a moisture level of six percent which is advantageous to both the grower and the ginner. Any moisture in excess of this will cause the cotton to gin poorly and give a rough lint preparation appearance that carries severe price penalties on the market.

Cotton as it reaches the gins has a variable moisture content, depending on how dry or humid the atmosphere is and the extent to which the coton, before or after picking, has been exposed to rain. It is, therefore, desirable, for efficient ginning, and to produce a fiber of high quality, that both drying and moisturizing apparatus be installed to either dry or moisten the seedcotton to bring its moisture content to the optimum six percent prior to ginning.

Since 1931, when the U.S. Cotton Ginning Research Laboratory demonstrated the practicability of a seedcotton drier for use at cotton gins, most gins have been equipped with two driers to handle cotton having varying degrees of excess moisture, but the necessity for controlling them has imposed a serious problem.

In my copending application, S. N. 349,779, filed March 5, 1964, I have disclosed an improved drying apparatus capable of the controlled removal of excess moisture from seedcotton.

One object of the present invention is to provide an apparatus for restoring moisture to excessively dry seedcotton. Another object is to provide such an apparatus which can be controlled automatically. Still another object is to provide a moisture-restoring apparatus adapted to be included as a unit of a cotton-conditioning complex comprising a drier in combination with a moisturizer installed before the gin. Other objects will become apparent to those skilled in the art from the description of the apparatus which follows.

In general, in accordance with the present invention, the apparatus comprises an enclosed tower, means for causing dry cotton to flow countercurrent to humid air, and means for diverting incoming cotton from the tower in the event the former is initially too moist and must be dried.

It was mentioned above that most gins are now provided with two driers. Both of these are referred to in the art as "multipath driers" and, in general, comprise towers having a plurality of horizontal staggered shelves to provide a long tortuous path for gravity flow of moist cotton. These driers are equipped with external by-pass ducts through which the cotton passes when drying is not necessary. The drier which is the subject of my above-mentioned copending application provides a choice of three lengths of exposure to hot air for optimum single-stage drying and can be used with a second drier of the conventional design in which only full-length exposure is possible.

The present moisture-restoring apparatus replaces the by-pass duct of the conventional full-length drier.

In order that the invention may be better understood, reference will now be made to the following detailed description and to the accompanying drawings in which.

Figure 1:
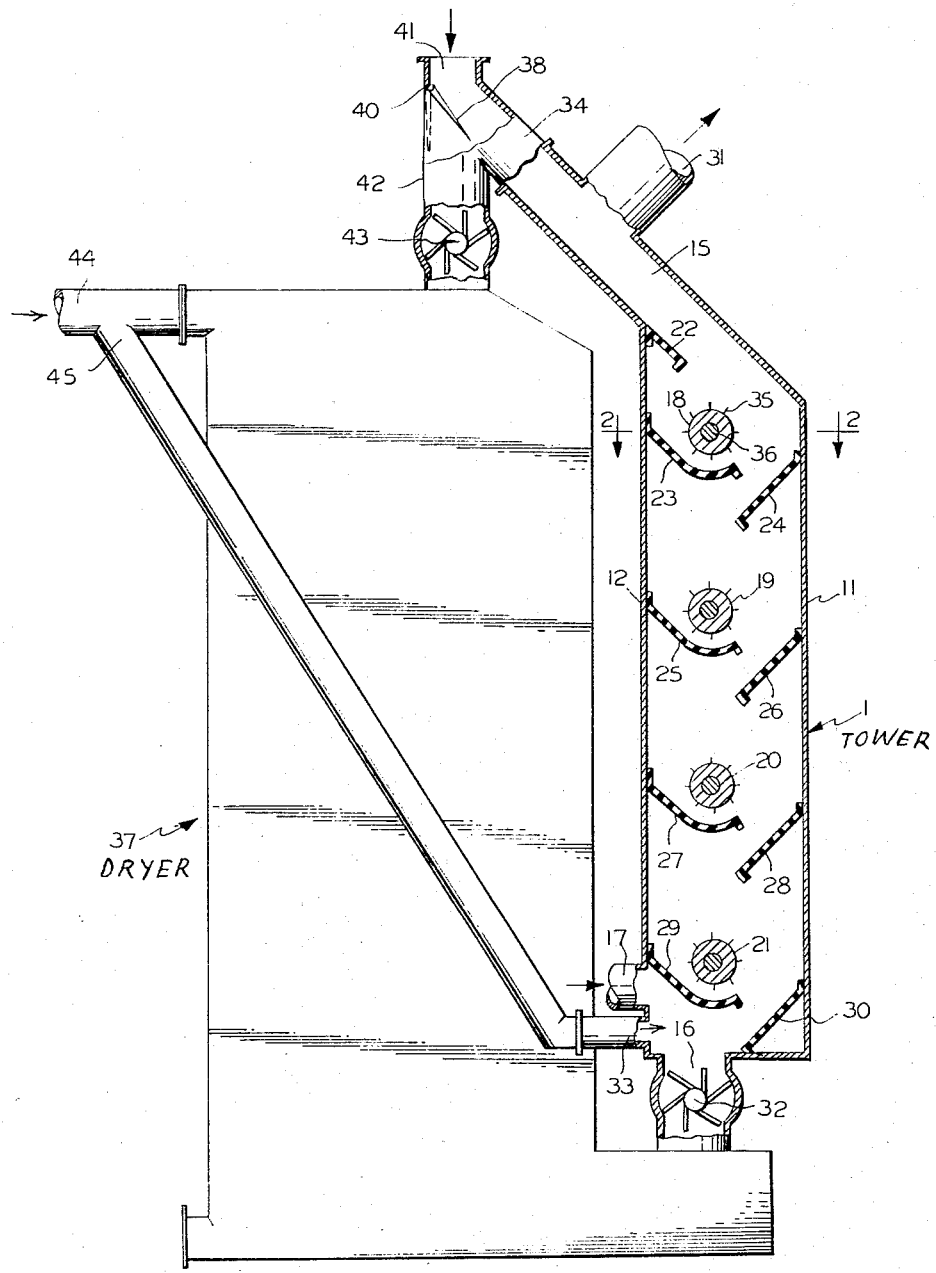
FIGURE 1 is a side elevation of the moisture restoring apparatus showing salient features of its construction.
Figure 2:
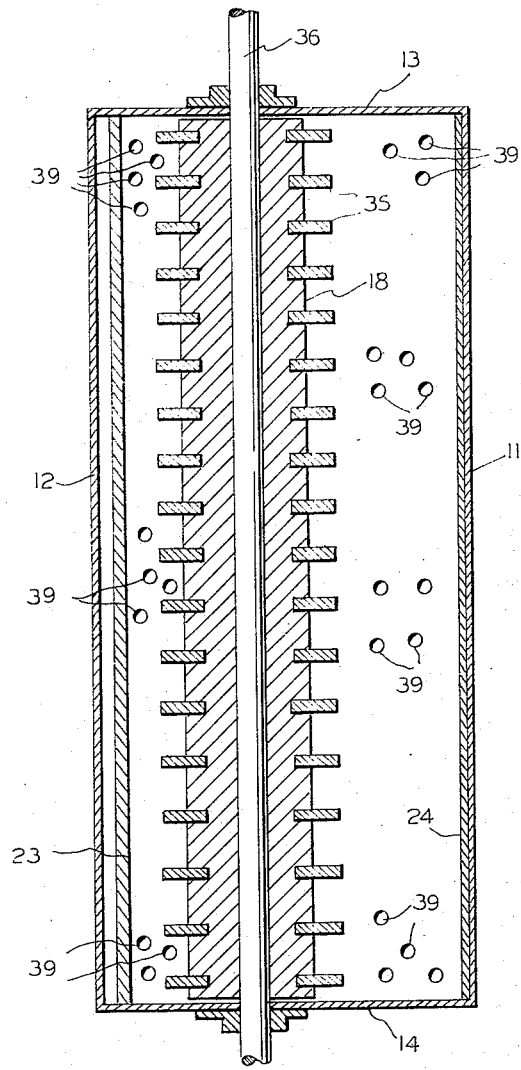
FIGURE 2 is an enlarged section on line 2—2 of FIGURE 1.

The casing of the moisture restoring apparatus has a front panel 11, back panel 12, and side panels 13 and 14, and is provided with an inlet duct 15 at its top through which dry cotton to which it is desired to add moisture is introduced. Duct 15 is connected to another duct 34 which is the upper portion of the drier by-pass referred to above. An outlet 16 is provided at the bottom of the tower through which the wetted cotton is discharged, while an inlet 17 near the bottom serves as an inlet for heated air of high humidity from a conventional humidifying apparatus (not shown). Humid air is discharged through outlet 31 after counterflowing upward through the descending cotton.

The tower contains a horizontal, rotatable, self-doffing cylinder 18 having peripheral spikes 35 for breaking up any wads of cotton. The cylinder is provided with shaft 36 which extends outside of casing of the tower to receive a conventional driving pulley (not shown). Also within the casing are perforated plates 22, 23, and 24, secured to the inner surfaces of the front and rear walls, for directing and retarding the cotton flow as it passes from top to bottom through the apparatus. The perforated sloping plate 22 extends down and inward from wall 12 and from the lower edge of inlet 15, terminating above spiked cylinder 18. Perforated, sloping plate 23 extends down and inward from panel 12 to a point near the lower quarter portion of cylinder 18. From this point it continues below and approximately one inch from and concentric with the cylinder for a distance of one quarter of the circumference of the cylinder. Perforated, sloping plate 24 extends down and inward from wall 11, commencing at a point just below the level of the terminus of plate 23 and extending downward to a terminal point just above the succeeding cylinder 19 and directly below the terminus of plate 23.

Figure 3:
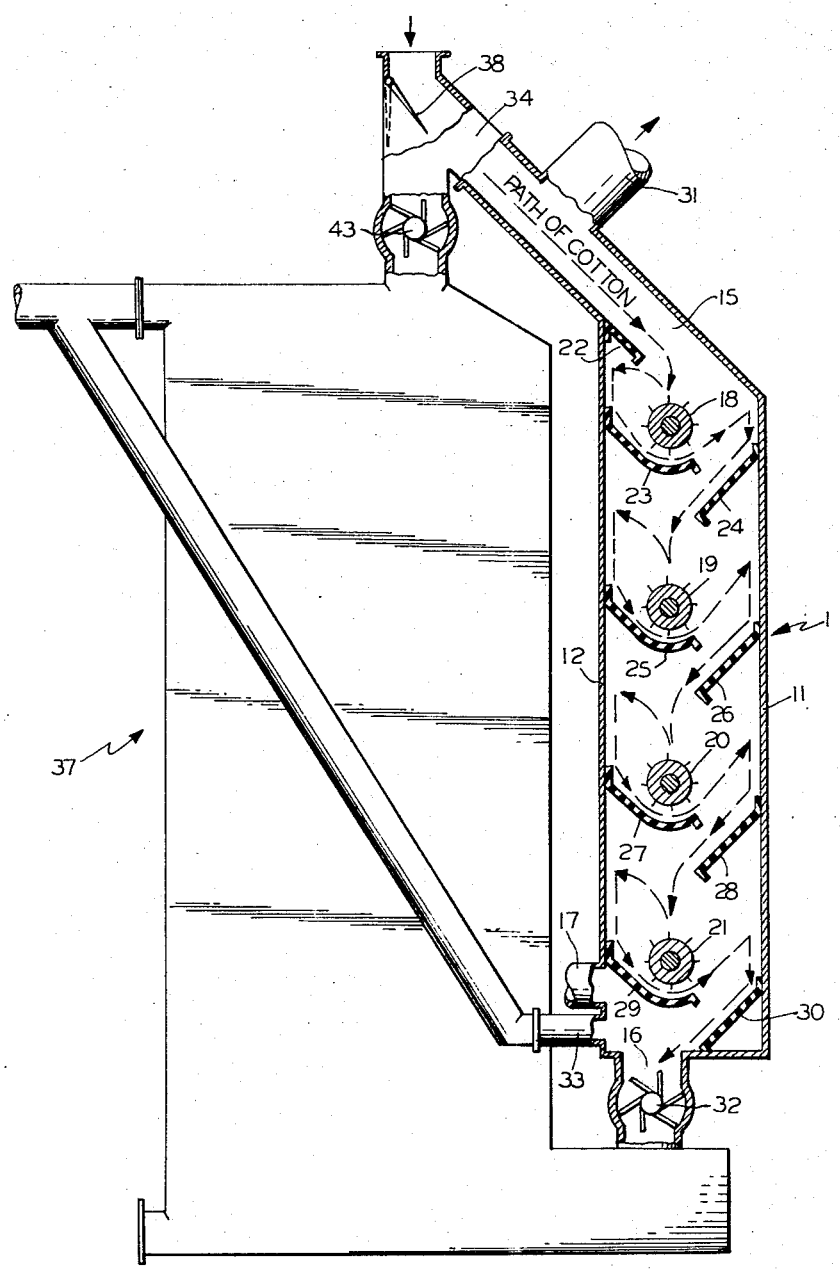
FIGURE 3 is a view, similar to FIGURE 1, showing the path of the cotton through the tower.

The construction is such that the cotton, which normally would pass through the by-pass duct of the conventional drier, indicated generally by 37, now gravitates into the moisture restoring apparatus, slides down along the top side of plate 22 and is received on the top portion of rotating spiked cylinder 18, which throws it in an upward direction against wall 12, thus breaking up any wads to better prepare the cotton to receive the moisture. This is shown in FIGURE 3. After striking wall 12 the cotton gravitates to perforated plate 23 and slides down along the top side of said plate and under the lower portion of rotating cylinder 18 where the cotton is again thrown by the cylinder in an upwardly direction against wall 11. It then gravitates to perforated plate 24 from which it slides and strikes the top portion of the succeeding rotating spiked cylinder 19.

To increase the efficiency of the moisture restoring apparatus, a plurality of spiked cylinders and perforated plates similar in construction to the first are provided in series and located in line below the inlet. In the particular construction illustrated there are three additional sets of spiked cylinders 19, 20, and 21 and perforated plates 25, 26, 27, 28, 29, and 30, respectively. As will be apparent from FIGURE 3, the falling cotton will traverse four similar paths, one in the vicinity of each spiked cylinder, thereby insuring that all clumps will be broken and that the cotton will receive maximum exposure to the humid air.

During this process of downward movement of the cotton through the apparatus, heated air of high humidity from a conventional humidifying apparatus (not shown) is injected into the bottom of the moisture restoring apparatus through inlet 17 and flows countercurrent to the descending cotton, passing up through the plates provided with perforations 39 and through the cotton with an appreciable amount of moisture being absorbed by the cotton.

When the cotton has passed the last spiked cylinder it is discharged through outlet 16 into vacuum feeder 32 which is a part of the existing multipath drier. The vacuum feeder feeds the wetted cotton into the lower portion of the drier by-pass and also prevents loss of humid air with the cotton, thus forcing the humid air up through the descending cotton. The cotton then passes on to the ginning process or other desired place of recovery by conventional means not shown.

As already described, the tower, indicated generally by 1, replaces the usual by-pass duct conventionally associated with drier 37. The remaining upper portion 34 of the by-pass, which is connected to a source of raw seedcotton (not shown), is provided inside with a valve 38 which is rigidly secured to rotatable shaft 40. Shaft 40 is connected to valve-operating means (not shown) similar to that provided for the similar valves of the drying apparatus described in my copending application. As described in the copending application, the valve-operating means is controlled by a signal generated by a moistur sensing device placed in the path of the incoming seedcotton, which signal is transmitted to a control device. The strength of the signal will increase with an increase in moisture content of the cotton. Thus, in my drying apparatus, the strength of the signal is used to selectively operate valves to direct excessively moist cotton to a predetermined inlet to the drier. In the apparatus of the present invention, the operating mechanism for valve 38 can be connected to the same control device used with the drier. When raw seedcotton containing less than the optimum six percent moisture passes the sensing element, the signal generated by the latter can be used to operate the control mechanism and to rotate valve 38 to the position shown in FIGURE 1. In this position the dry cotton will be directed from inlet 41 to by-pass 34 into inlet 15 of the moisturing restoring apparatus. However, should the cotton passing the sensing device contain excessive moisture, the control mechanism will cause valve 38 to assume the vertical position indicated by the dotted lines and the cotton will fall into drying tower 37 through duct 42 and vacuum feed valve 43.

During any period in which cotton is being dried, it is not necessary to provide humid air to tower 1. Therefore, in accordance with techniques familiar to those skilled in the art, the sensing device can also be connected to operate the air-humidifying apparatus (not shown). However, during such drying periods, tower 1 will become cool. To prevent condensation of moisture from the humidifying air when operation of tower 1 is resumed, a small portion of hot dry air supplied to drier 37 from duct 44 is continuously by-passed through duct 45 to inlet 33 to keep tower 1 warm. The volume of dry hot air is small enough not to seriously lower the humidity of the air supplied through inlet 17, but it is sufficient to keep tower 1 warm enough to prevent condensation. By properly adjusting the humidity of the air introduced into inlet 17, it is possible to select air velocities such that the combined velocities of the air introduced into inlets 17 and 33 will not be great enough to lift and convey the falling seedcotton, thus not to prevent the counter-current flow of air and cotton.

Having described my invention, what I now claim is:
1. In combination with a seedcotton drying apparatus, a seedcotton moisturizing by-pass comprising:
   (a) an elongated, vertical, enclosed tower adjacent to and substantially coextensive with said drying apparatus;
   (b) a cotton inlet connected to the top of the drying apparatus and the tower;
   (c) means inside the cotton inlet for selectively directing cotton to the drying apparatus and the tower;
   (d) inlet means for introducing humid air into the bottom of the tower;
   (e) a plurality of horizontal, parallel, vertically-stacked cylinders, having radially-extending spikes on their surfaces, rotatably mounted in the tower;
   (f) an inclined, rectilinear, perforated baffle secured to an inside wall of the tower for directing seedcotton at the uppermost of the cylinders;
   (g) an inclined, contoured, perforated baffle secured to an inside wall of the tower extending under each of the cylinders;
   (h) a plurality of inclined, rectilinear, perforated baffles secured to an inside wall of the tower opposite the contoured baffles in staggered relation thereto and extending under said contoured baffles; and
   (i) means for removing moistened cotton from the bottom of the tower.

2. Apparatus for conditioning seedcotton for ginning comprising a first vertical, elongated, enclosed tower for drying excessively moist seedcotton; first cotton inlet means connected to the top of said first tower; first cotton removing means connected to the bottom of said first tower; and, as a means for moisturizing excessively dry seedcotton:
   (a) a second vertical, enclosed, elongated tower substantially coextensive with said first tower;
   (b) second cotton inlet means connecting the top of the second tower with the first cotton inlet means;
   (c) second cotton removing means connecting the bottom of the second tower with the first cotton removing means;
   (d) means for selectively directing cotton to the first and second cotton inlet means;
   (e) means for introducing humid air into the bottom of the second tower;
   (f) a plurality of horizontal, parallel, vertically-stacked cylinders, having radially-extending spikes on their surfaces, rotatably mounted in the second tower;
   (g) an inclined, rectilinear, perforated baffle secured to an inside wall of the second tower for directing seedcotton at the uppermost of the cylinders;
   (h) an inclined, contoured, perforated baffle secured to an inside wall of the second tower extending under each of the cylinders; and
   (i) a plurality of inclined, rectilinear, perforated baffles secured to an inside wall of the second tower opposite the contoured baffles in staggered relation thereto and extending under said contoured baffles.

References Cited by the Examiner
UNITED STATES PATENTS

| | | | |
|---|---|---|---|
| 940,144 | 11/1909 | Geiger | 34—174 |
| 1,679,099 | 7/1928 | Smith | 34—171 X |
| 1,920,107 | 7/1933 | Richardson | 34—174 X |
| 2,883,709 | 4/1959 | Deems et al. | 34—168 X |
| 3,069,730 | 11/1962 | Vandergriff | 19—027 X |

FREDERICK L. MATTESON, JR., *Primary Examiner.*

C. R. REMKE, *Assistant Examiner.*